May 1, 1951          A. R. LAMBERT          2,551,018
LAWN MOWER WHEEL

Filed June 6, 1946          2 Sheets-Sheet 1

INVENTOR.
Alvah Roy Lambert
BY Henry G. Dybvig
His Attorney

Patented May 1, 1951

2,551,018

UNITED STATES PATENT OFFICE 2,551,018

LAWN MOWER WHEEL

Alvan Ray Lambert, Dayton, Ohio, assignor to Lambert Products, Inc., Dayton, Ohio, a corporation of Ohio Application June 6, 1946, Serial No. 674,678

1 Claim. (Cl. 301—6)

This invention relates to a rubber tired wheel and more particularly to a rubber tired wheel wherein the parts for supporting the rubber tires may be made from stampings, but not necessarily so limited.

An object of this invention is to provide a rubber tired wheel that is light in weight, easily produced, preferably from stampings, but not necessarily made from stampings, which wheel is strong, dependable and durable.

Another object of this invention is to provide a wheel for supporting a rubber tire, wherein the rubber tire is supported primarily upon the stamping attached to the hub and held in position by a hub cap terminating in a marginal rim portion engaging the side of the tire.

Another object of this invention is to provide a wheel for a lawn mower, or similar device wherein a rubber tired wheel is used, the wheel supporting an internally toothed ring gear.

Other objects and advantages reside in the construction of parts, the combination thereof and the mode of operation, as will become more apparent from the following description.

Figure 2:
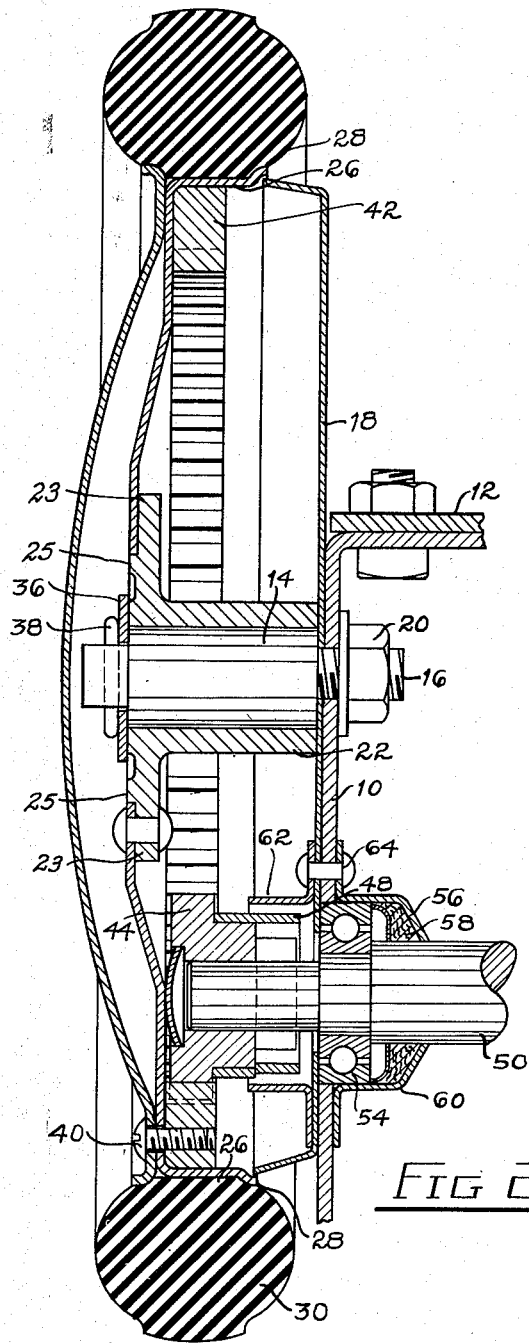
Figure 2 is a cross sectional view of a rubber tired wheel showing the hub and the pinion for driving the cutting reel.
Figure 1:
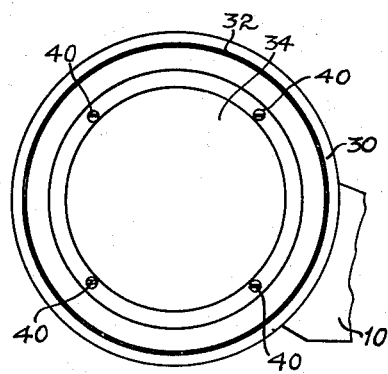
Figure 1 is a side elevational view of a rubber tired wheel adapted for use in a lawn mower.
Figure 3:
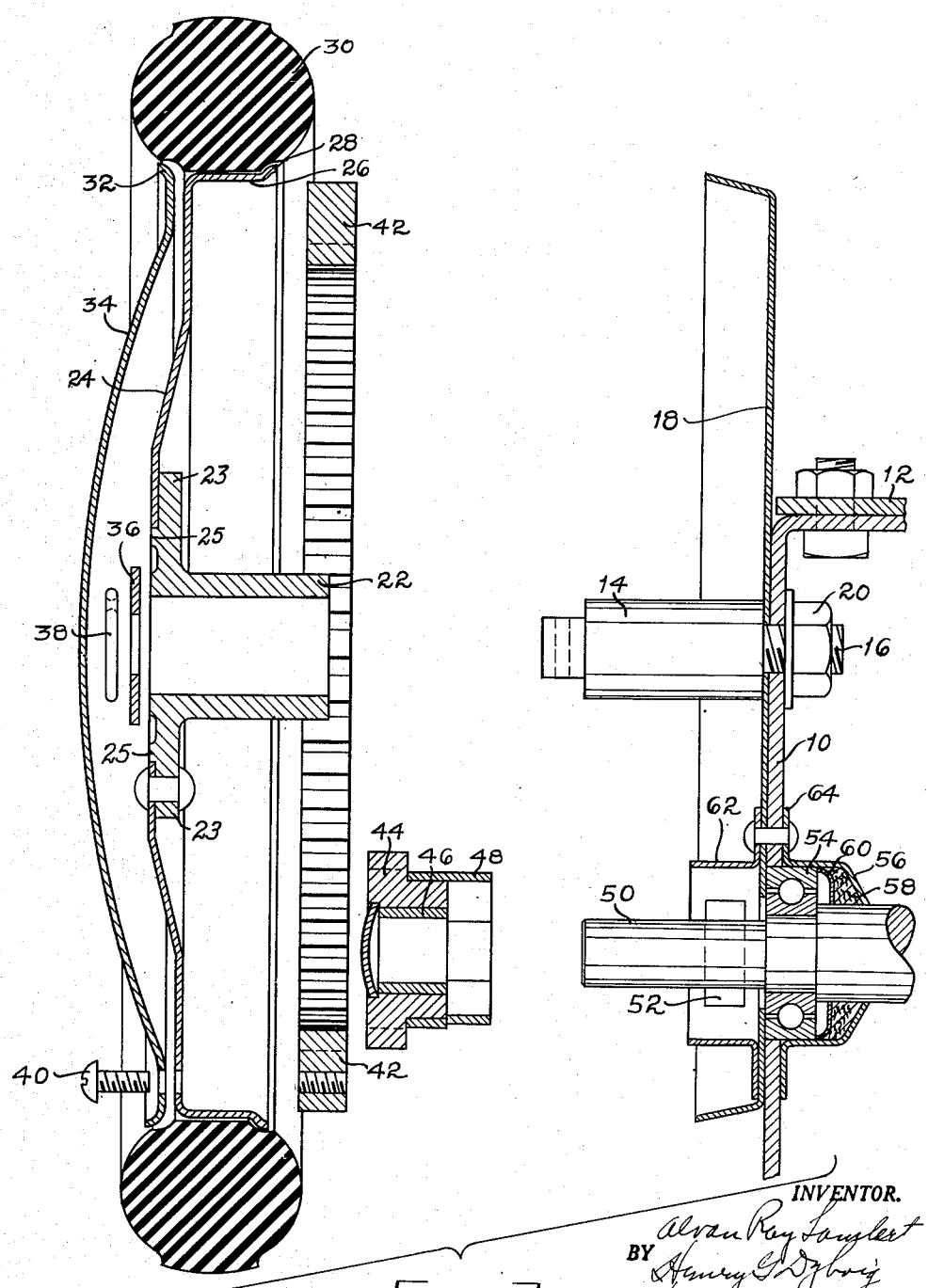
Figure 3 is an exploded cross sectional view of the parts shown in Figure 2.

Referring to the drawings, member 10 is an end frame of a lawn mower, the two end frames being held together by member 12, as more fully disclosed in my now abandoned copending application Serial No. 692,615, filed August 23, 1946, for Lawn Mower. The end frame member 10 supports a pintle 14, having a threaded reduced portion 16 passing through a suitable aperture in member 10 and through a shield member 18. A suitable nut 20 engages the threaded end of portion 16, so as to hold the pintle in position.

The pintle 14 has journalled thereon a hub 22, held in position by a suitable washer 36 and a cotter pin 38. The hub 22 is provided with a radially disposed flange 23 and an annular or circular shoulder 25 cooperating with said flange to provide a rabbet. The hub 22 has riveted thereto a disc wheel member 24 provided with a marginal flange 26, which extends parallel to the axis of rotation of the wheel. The flange 26 terminates in a rib or bead 28 engaging the side of a rubber tire 30. This tire 30 is held in position by a rib or bead 32 integral with a disc 34 forming a hub cap that completely shields the hub 22 and the pintle 14. The hub cap 34 and the rib 32 are held in position by a plurality of screws 40 threadedly engaging threaded apertures in an internally toothed ring gear 42 pressfitted or snugly seated within the flange 26, so that this ring gear functions in addition to a gear member as a reenforcing member for the tire rim and a clamping member for holding the hub cap 34 in position. Said ring gear 42 extends across the center of the width of the tire, so as to reenforce the flange in the middle of the tire.

The internally threaded gear 42 meshes with a pinion 44 provided with a bearing 46 and a ratchet stamping 48 mounted for rotation upon the end of the reel shaft 50, provided with a reciprocatory pawl 52 cooperating with the ratchet stamping member 48 to form a one-way clutch. The shaft 50 is journalled in suitable bearings 54 held in position by a sealing member 56 housing a gasket 58 positioned between member 56 and the disc 60. A flanged housing 62 surrounds a portion of the ratchet stamping member 48. Members 56 and 62 are riveted to members 10 and 18 by suitable rivets 64. The ratchet clutch shown herein is more fully described and claimed in the now abandoned Wilgus application for United States Letters Patent Serial No. 674,821, filed June 6, 1946, for Ratchet Mechanism.

It can readily be seen that the disc member 18, fixedly attached to the frame member of the lawn mower, cooperates with the hub cap 34 to completely conceal the hub 22, the ring gear 42, the pinion 44 and the ratchet member 48. Members 18 and 34 do not only conceal these parts; but also deter dirt, grass and debris from entering the movable parts. In other words, this hub cap 34 enhances the appearance of the wheel assembly and in addition thereto, the hub cap 34, cooperating with the disc 18, is an improvement upon the conventional lawn mower wheel assembly in keeping the parts clean.

In removing, changing tires or mounting a new tire, it is merely necessary to unscrew the screws 40, remove the hub cap 34, integral with the rim 32, permitting axial removal of the tire 30. When the tire has been replaced or a new tire has been put in position, it is slipped over the flange 26, so as to abut the bead or rim 28, the hub cap inserted in position, the screws 40 tightened, so as to rigidly clamp the tire in position.

Although this wheel assembly has been shown in connection with a lawn mower, it may be used for numerous other purposes. For example, it could be used as a wheel for a wagon, a cart, a wheelbarrow, a tricycle and numerous types of toys. It could also be used for garden tractors, garden implements and numerous other places where a wheel of this type is adaptable.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In a lawn mower assembly having a fixed frame supporting a pintle, the combination including a flanged disc member, means for supporting said flanged disc member for rotation upon said pintle, the flange of said disc member extending parallel to the axis of rotation and terminating in a bead portion, a hub cap member terminating in a bead portion, a ring gear snugly mounted within said flange, said ring gear extending across the center of the width of the wheel so as to reenforce said flange, said ring gear having a plurality of threaded apertures, a plurality of screws for clamping the disc member the hub cap and the ring gear together and a rubber tire mounted upon said flange and clamped between the bead portions.

ALVAN RAY LAMBERT.

REFERENCES CITED

The following references are of record in the file of this patent:

UNITED STATES PATENTS

| Number | Name | Date |
|---|---|---|
| 1,188,637 | Ferguson | June 27, 1916 |
| 1,387,477 | De More | Aug. 16, 1921 |
| 2,076,344 | Leake | Apr. 6, 1937 |
| 2,187,557 | Gillespie | Jan. 16, 1940 |

FOREIGN PATENTS

| Number | Country | Date |
|---|---|---|
| 136,688 | Great Britain | 1919 |
| 226,542 | Great Britain | 1940 |